(12) United States Patent
Hamada et al.

(10) Patent No.: US 8,595,728 B2
(45) Date of Patent: Nov. 26, 2013

(54) SYSTEM FOR JUDGING AN EXECUTION STATUS OF BATCH PROCESSING, AND BASED ON JUDGEMENT RESULT TO SEND POST-UPDATE DATA TO TERMINAL DEVICE

(75) Inventors: Shinsuke Hamada, Yokohama (JP); Norihiro Hara, Kawasaki (JP); Yasuhiro Tahara, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 798 days.

(21) Appl. No.: 12/714,243

(22) Filed: Feb. 26, 2010

(65) Prior Publication Data

US 2011/0035748 A1 Feb. 10, 2011

(30) Foreign Application Priority Data

Aug. 10, 2009 (JP) ................................. 2009-185725

(51) Int. Cl.
*G06F 9/46* (2006.01)
*G06F 17/30* (2006.01)

(52) U.S. Cl.
USPC ............. 718/101; 707/999.203; 707/999.201; 707/999.204; 711/162; 714/6.3

(58) Field of Classification Search
USPC .................... 718/101, 106; 711/162; 714/6.3; 707/999.201, 999.204, 999.003
See application file for complete search history.

(56) References Cited

U.S. PATENT DOCUMENTS

| | | | | |
|---|---|---|---|---|
| 6,560,614 B1* | 5/2003 | Barboy et al. | ................. | 707/611 |
| 6,694,406 B2* | 2/2004 | Kodama et al. | ................. | 711/114 |
| 6,952,718 B2* | 10/2005 | Nakamura et al. | ............ | 709/205 |
| 7,185,227 B2* | 2/2007 | Eguchi et al. | ................... | 714/15 |
| 7,191,299 B1* | 3/2007 | Kekre et al. | ................... | 711/162 |
| 8,239,344 B2* | 8/2012 | Hirakawa et al. | ............. | 707/613 |
| 2003/0126387 A1* | 7/2003 | Watanabe | ..................... | 711/161 |
| 2006/0020754 A1* | 1/2006 | Suzuki et al. | ................. | 711/114 |
| 2010/0042999 A1* | 2/2010 | Dorai et al. | ................... | 718/101 |

OTHER PUBLICATIONS

Brewer, E., "Lessons from Giant-Scale Services", *Internet Computating, IEEE*, vol. 5, Issue 4, Jul.-Aug. 2001, p. 54.

* cited by examiner

*Primary Examiner* — Meng An
*Assistant Examiner* — Abu Ghaffari
(74) *Attorney, Agent, or Firm* — Foley & Lardner LLP

(57) ABSTRACT

An execution system executes an update batch according to an update batch execution request from a terminal device and gives a batch execution command to each standby system. Each system stores the content of updated data in its update buffer; and subject to termination of the update batch by each system, the post-update data content is reflected in a database. While the above processing is performed, the execution system and the standby systems accept a reference request from the terminal device; and in a case of "batch not executed" or "batch in execution", each system searches the database and then returns the pre-update data content to the terminal device; and in a case of "update content being reflected", each system searches the database or the update buffer and then returns the post-update data content to the terminal device.

14 Claims, 11 Drawing Sheets

FIG. 3
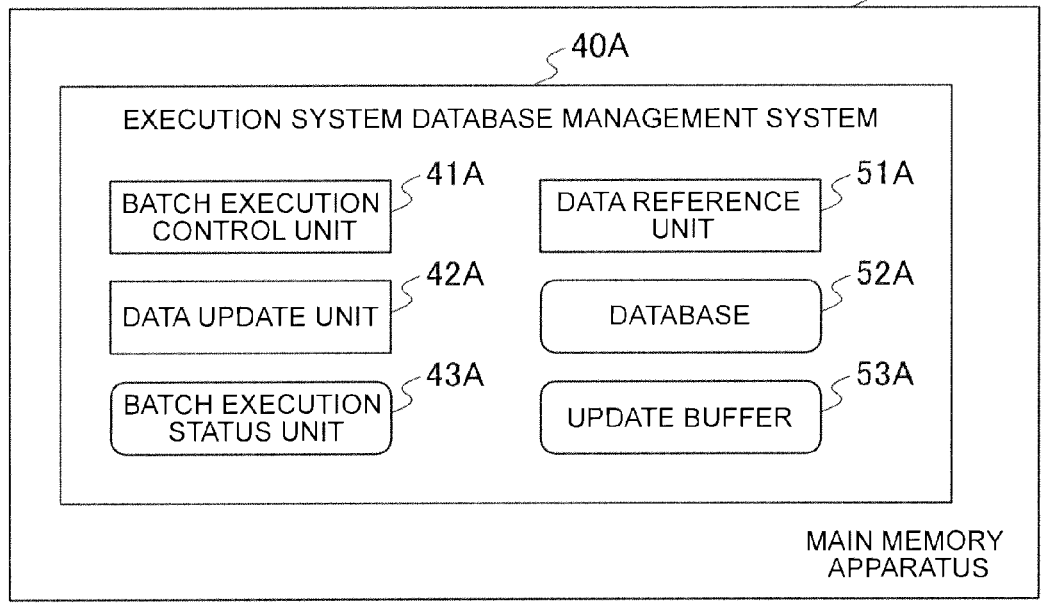
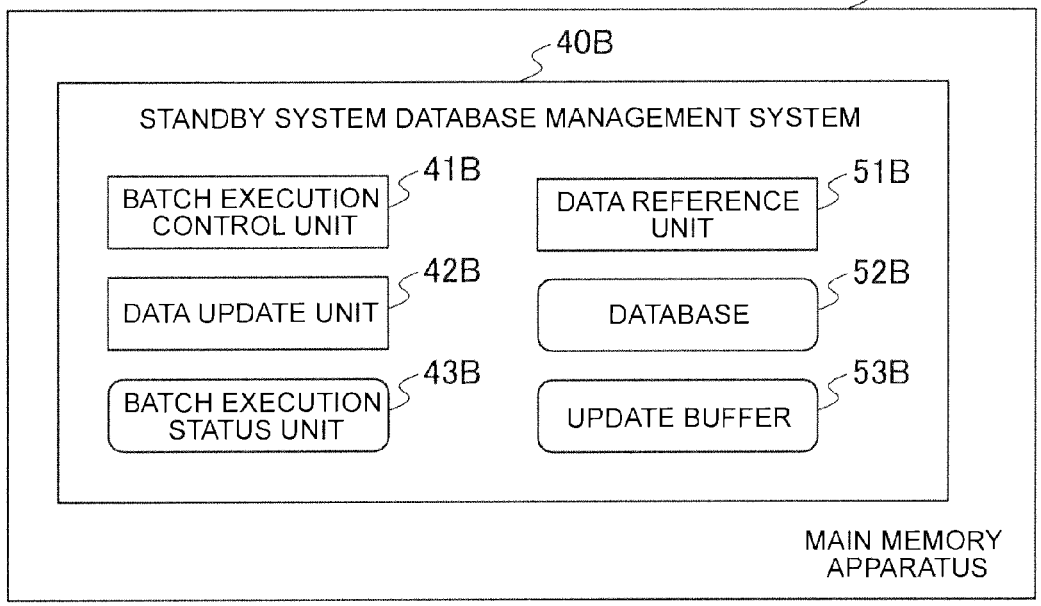

FIG.4

| ROW ID | ROW DATA | UPDATE STATUS |
|---|---|---|
| 1000 | DATA1 | NOT UPDATED |
| 1001 | DATA2 | UPDATED |
| 1002 | DATA3 | UPDATED |
| 1003 | DATA4 | NOT UPDATED |
| 1004 | DATA5 | UPDATED |

SYSTEM FOR JUDGING AN EXECUTION STATUS OF BATCH PROCESSING, AND BASED ON JUDGEMENT RESULT TO SEND POST-UPDATE DATA TO TERMINAL DEVICE

CROSS-REFERENCES TO RELATED APPLICATIONS

This application relates to and claims priority from Japanese Patent Application No. 2009-185725, filed on Aug. 10, 2009, the entire disclosure of which is incorporated herein by reference.

BACKGROUND

1. Field of the Invention

The present invention relates to a technique for providing online services to users' terminal devices, using data managed by databases.

2. Description of Related Art

With the development of the information society, many companies provide online services, using databases. Examples of such online services include bank ATM systems and road and railroad navigation systems.

Recently, due to intensifying competition among companies, each company has been trying to differentiate themselves by expanding services, extending the amount of service providing time, and even providing online services continuously.

Also, with an increase in the number of terminals using online services, such as the Internet terminals and cellphones, the amount of access to the online services has been increasing. Therefore, for example, with an online service, such as a road or railroad navigation service, for processing a large quantity of data reference requests from terminals, a database with the same content is placed in a plurality of apparatuses so that the reference requests from the terminals are distributed to and processed by the plurality of apparatuses.

A database management system sometimes executes daily routine tasks collectively by means of batch processing. Examples of such batch processing include processing to regularly update data to which an online service refers to. Since a large quantity of data is accessed in the batch processing, system load tends to increase. Accordingly, the batch processing is often executed at night outside online service hours when the load is comparatively low.

However, companies are providing online services continuously and are required to execute batch processing without stopping the online services. "Rolling upgrade" is an example of a technique of performing maintenance including batch processing without stopping online services where a database with the same content is placed in a plurality of apparatuses (see E. A. Brewer "Lessons from giant-scale services," Internet Computing, IEEE, Vol. 5, Issue 4, July-August, 2001, P. 54).

Rolling upgrade is performed so that the plurality of apparatuses stop the online service in turns to perform maintenance, thereby executing batch processing without stopping the online service provided by the system as a whole.

However, if the rolling upgrade is performed in order to execute batch processing requiring updates on the database in each apparatus, batch termination time will be different for each apparatus. So, even if the same reference request is executed at each apparatus at the same time, a reference result will be different for each apparatus.

For example, the same database is placed in three apparatuses and the following sequence of procedures is executed in turns in the order of a first apparatus, a second apparatus, and a third apparatus: stopping an online service; executing batch processing requiring updates; and then resuming the online service. If the same reference request is executed on the first and third apparatuses during execution of the batch processing requiring updates on the second apparatus, a reference result after the batch processing will be obtained from the first apparatus and a reference result before the batch processing will be obtained from the third apparatus, that is, the reference results from those apparatuses will be different.

SUMMARY

The present invention was devised in light of the problems of the related art described above, and it is an object of the invention to provide a data processing method, data processing program, and data processing system capable of always making reference results obtained from all the data processing apparatuses identical to each other even if the batch processing requiring updates is executed while the entire system operates online.

In order to achieve the above-described object, the present invention is characterized in that a plurality of units are provided, each unit including a storage device having at least a first storage unit and a second storage unit as a plurality of storage units for storing data, and a data processing apparatus for processing the data in the storage device; wherein the data processing apparatus belonging to at least one unit from among the plurality of units executes batch processing requiring an update on the data in the storage device when receiving a batch execution request from a terminal device which makes the request for the processing; and wherein each data processing apparatus belonging to each unit stores post-update data obtained as a result of the update by the batch processing in the second storage unit for each storage device and, subject to completion of the processing for storing the post-update data in the second storage unit, each data processing apparatus starts reflecting the post-update data, which is stored in the second storage unit, in the first storage unit for each storage device at the same time, thereby executing the reflection. When receiving a reference request from the terminal device during the process of the batch processing, each data processing apparatus judges an execution status of the batch processing, and then sends the content of the first storage unit or the second storage unit for each storage device as a reference result to the terminal device according to the result of the above judgment.

Even if the batch processing requiring updates is executed while the entire data processing system operates online, the reference results obtained from all the data processing apparatuses can be made identical to each other.

BRIEF DESCRIPTION OF THE DRAWINGS

FIG. 3 is a diagram showing functional blocks of main memory apparatuses according to an embodiment of the invention;

FIG. 4 is a configuration diagram of a database according to an embodiment of the invention;

DETAILED DESCRIPTION OF PREFERRED EMBODIMENTS

A preferred embodiment of a data processing system according to the present invention will be explained in detail below with reference to the attached drawings.

Figure 1:
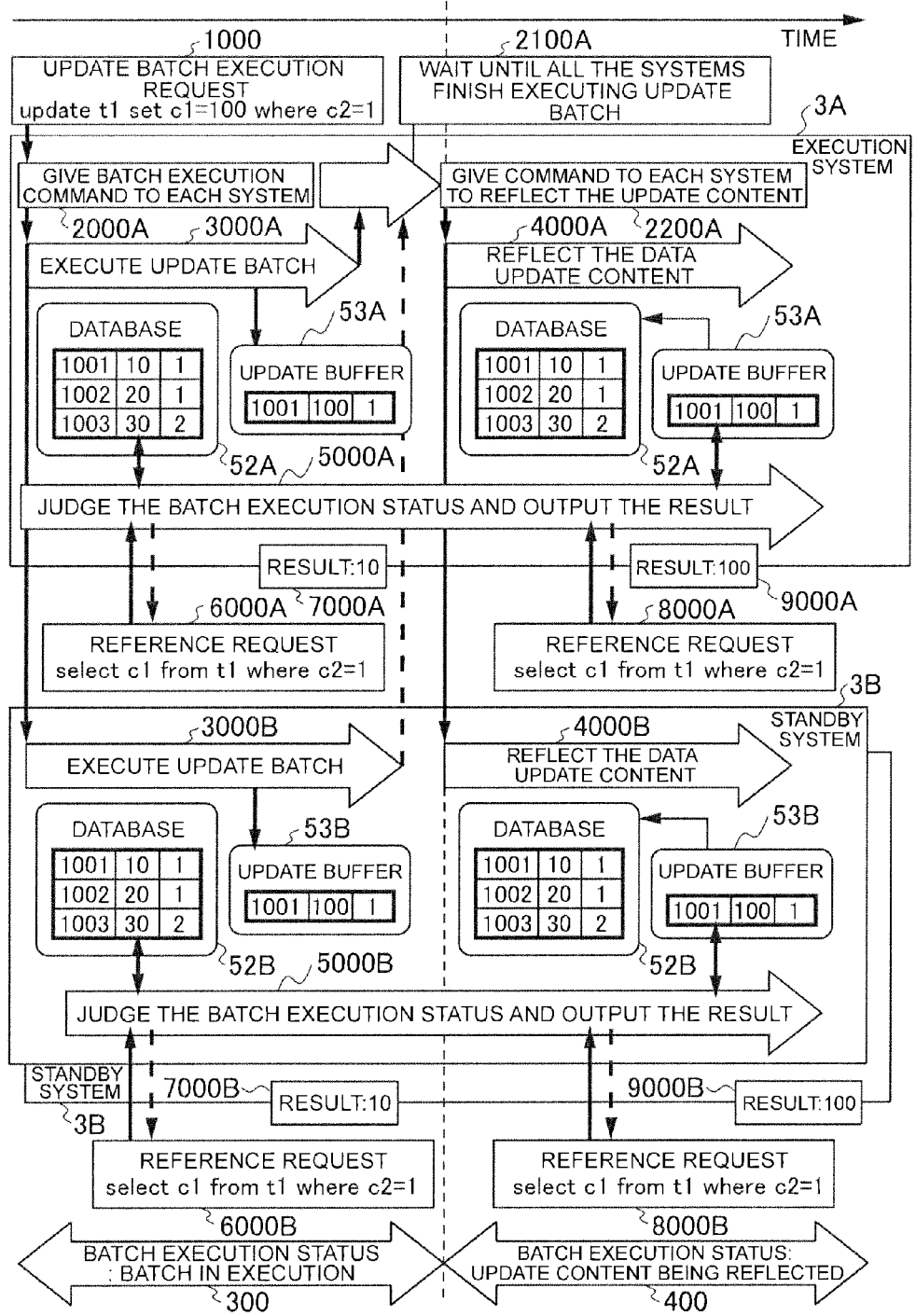
FIG. 1 is a concept diagram of the present invention.

First, the concept of this invention will be briefly explained with reference to FIG. 1. Referring to FIG. 1, a data processing system according to the invention is equipped with an execution system 3A and two or more standby systems 3B.

The execution system 3A is composed as a unit including a database 52A and an update buffer 53A as storage devices, and a data processing apparatus (not shown) for processing data in the database 52A and the update buffer 53A; and each standby system 3B is composed as a unit including a database 52B and an update buffer 53B as storage devices, and a data processing apparatus (not shown) for processing data in the database 52B and the update buffer 53B.

While the entire data processing system operates online, the execution system 3A accepts an update batch execution request 1000 from a terminal device (not shown), which makes the request for processing, controls batch processing in the plurality of standby systems 3B, and executes batch processing requiring data updates (hereinafter referred to as the "update batch"). At the same time, the execution system 3A accepts a reference request 6000A or 8000A from the terminal device and returns a reference result 7000A or 9000A to the terminal device.

While the entire data processing system operates online, each standby system 3B executes the update batch in accordance with a batch execution command from the execution system 3A. At the same time, each standby system 3B accepts a reference request 6000B or 8000B from the terminal device and returns a reference result 7000B or 9000B to the terminal device.

In the above-described situation, both the execution system 3A and the standby systems 3B are embodied by one or more processes.

Specifically speaking, after receiving the update batch execution request 1000, the execution system 3A executes the update batch according to the batch execution request and also gives a batch execution command to the plurality of standby systems 3B (2000A). Each of the standby systems 3B executes the update batch. Then, each of the execution system 3A and the plurality of standby systems 3B stores the content of data updated by the update batch in the update buffer 53A or 53B (3000A and 3000B). For example, if row data of row ID "1001" is updated, each of the execution system 3A and the plurality of standby systems 3B stores post-update row data "100" in the update buffer 53A or 53B.

Subsequently, the execution system 3A waits until all of the execution system 3A and the plurality of standby systems 3B finish the update batch execution (2100A). Then, after receiving completion notice of the update batch execution from the execution system 3A and the plurality of standby systems 3B, the execution system 3A gives a command to the execution system 3A and the plurality of standby systems 3B to reflect the post-update data content, which is stored in the update buffer 53A or 53B, in the database 52A or 52B (2200A).

Next, each of the execution system 3A and the plurality of standby systems 3B reflects the post-update data content, which is stored in the update buffer 53A or 53B, in the database 52A or 52B (4000A and 4000B).

For example, if the post-update data stored in the update buffer 53A or 53B is the row data "100" of the row ID "1001," the row data "100" is reflected in row data "10" of the row ID "1001" in the database 52A or 52B.

After accepting the reference request (6000A, 6000B, 8000A, 8000B) from the terminal device in parallel with the batch processing, each of the execution system 3A and the standby systems 3B judges the update batch execution status of the data processing system and the update status of the row data in the database; and if the update batch is not executed (hereinafter referred to as "batch not executed") or the update batch is in execution (hereinafter referred to as "batch in execution" 300), each system searches its own database 52A or 52B and then returns a search result (7000A or 7000B) to the terminal device based on the content of the database 52A or 52B before the execution of the batch processing.

On the other hand, if the update result of the update batch is being reflected in the database 52A or 52B (hereinafter referred to as "update content being reflected" 400), each of the execution system 3A and the standby systems 3B searches its own database 52A or 52B and update buffer 53A or 53B and then returns a search result (9000A or 9000B) to the terminal device based on the content of the database 52A or 52B after the update batch execution (5000A or 5000B).

For example, in the case of the "batch in execution" 300, the post-update data as a result of the update by the update batch is not necessarily stored in all the update buffers 53A, 53B; however, since the database 52A, 52B stores the pre-update data before the update by the update batch, each of the execution system 3A and the standby systems 3B refers to its database 52A, 52B and then returns the pre-update data "10" to the terminal device.

On the other hand, in the case of the "update content being reflected" 400, the post-update data as a result of the update by the update batch is stored in the update buffer 53A, 53B and the post-update data stored in the update buffer 53A, 53B is reflected in the database 52A, 52B. Therefore, each of the execution system 3A and the standby systems 3B refers to the update buffer 53A, 53B or the database 52A, 52B and then returns the post-update data "100" to the terminal device.

The execution system 3A controls the batch execution as described above while the entire data processing system operates online, so that it can control the batch execution status in the entire data processing system. Accordingly, the execution system 3A and the two or more standby systems 3B judge the same batch execution status and return the reference results to the terminal device. Therefore, the results obtained from all the systems for the same reference request made at the same time are always made identical to each other.

Figure 2:
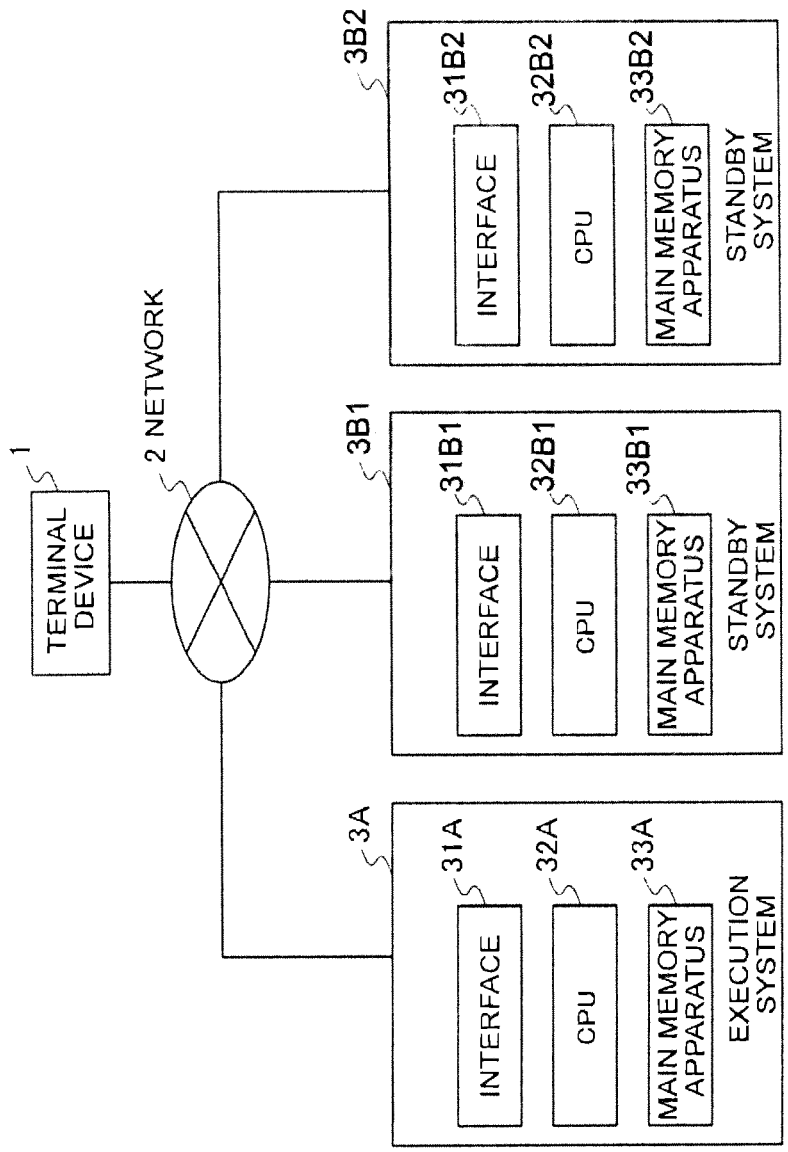
FIG. 2 is a configuration diagram of a data processing system according to an embodiment of the invention.

Next, FIG. 2 shows the hardware configuration of the data processing system according to this embodiment. Referring to FIG. 2, the data processing system includes the execution system 3A and the two or more standby systems 3B; and the execution system 3A and each standby system 3B are connected to each other via a network 2 and also connected to the terminal device 1 via the network 2.

The execution system 3A is composed of a computer equipped with an interface 31A, a CPU (Central Processing Unit) 32A, and a main memory apparatus 33A, while each standby system 3B (e.g., 3B1. 3B2, etc.)is composed of a computer equipped with an interface 31B(e.g., 31B1, 31B2, etc.), a CPU (Central Processing Unit) 32B (e.g., 32B1, 32B2. etc.), and a main memory apparatus 33B(e.g., 33B1, 33B2, etc.).

The interface 31A, 31B functions as an interface for data communication between the execution system 3A and each standby system 3B via the network 2 and also as an interface for data communication between the execution system 3A and each standby system 3B, and the terminal device 1 via the network 2.

The main memory apparatus 33A, 33B functions as a storage device that stores various data such as object data of batch processing and data relating to the batch processing and also stores programs; and the main memory apparatus 33A, 33B is constituted from storage media such as semiconductor memories including volatile semiconductor memories or nonvolatile semiconductor memories, and hard disk drives (HDD). The CPU 32A, 32B functions as a data processing apparatus for processing data according to the programs stored in the main memory apparatus 33A, 33B. The data processing system is designed to construct databases having the same configuration for the main memory apparatuses 33A, 33B and manage data, using these databases.

The terminal device 1 sends an update batch execution request to the execution system 3A via the network 2 and sends a reference request to the execution system 3A and the standby systems 3B via the network 2.

While the entire data processing system including the CPU 32A operates online, the execution system 3A receives the update batch execution request and the reference request from the terminal device 1 and operates data in the main memory apparatus 33A. On the other hand, the standby system 3B operates as a redundant system of the execution system 3A. Specifically speaking, the standby system 3B stands by while the execution system 3A is operating as an active system; and if a failure occurs in the execution system 3A, the standby system 3B acts for the execution system 3A by executing the processing to be performed by the execution system 3A. Since the standby system 3B executes the processing in place of the execution system 3A, it has at least the same components as those of the execution system 3A.

In this way, one execution system 3A and two or more standby systems 3B operate as redundant systems for each other. The execution system 3A and the standby systems 3B will be hereinafter collectively referred to as the "redundant systems."

However, while the standby system 3B is in a standby mode, the CPU 32B receives commands from the CPU 32A for the execution system 3A and reference requests from the terminal device 1. While the entire data processing system including the CPU 32B operates online, the CPU 32B operates data in the main memory apparatus 33B in accordance with the commands from the CPU 32A or the reference requests from the terminal device 1.

FIG. 3 is a diagram showing functional blocks of an execution system database management system in the main memory apparatus 33A for the execution system 3A shown in FIG. 2 and a standby system database management system in the main memory apparatus 33B for the standby system 3B shown in FIG. 2.

The main memory apparatus 33A for the execution system 3A stores information about an execution system database management system 40A. The execution system database management system 40A is constituted from: programs to be executed by the CPU 32A for constructing a batch execution control unit 41A, a data update unit 42A, and a data reference unit 51A; and a batch execution status unit 43A, the database 52A, and the update buffer 53A serving as storage units for storing data relating batch processing.

The main memory apparatus 33B for the standby system 3B stores information about a standby system database management system 40B. The standby system database management system 40B is constituted from: programs to be executed by the CPU 32B for constructing a batch execution control unit 41B, a data update unit 42B, and a data reference unit 51B; and a batch execution status unit 43B, the database 52B, and the update buffer 53B serving as storage units for storing data relating batch processing.

The databases 52A, 52B are formed to have the same configuration, using, for example, a database composed of hard disk drives and a memory database composed of semiconductor memories, and serve as a first storage unit storing data relating to the batch processing. The update buffers 53A, 53B serve as a second storage unit for storing post-update data as a result of the update by the batch processing. The batch execution status units 43A, 43B serve as a third storage unit for storing data indicating the execution status of the batch processing.

After receiving a batch execution request from the terminal device 1, the batch execution control unit 41A generates a command relating to the batch processing and outputs it to the data update unit 42A, 42B. The data update unit 42A, 42B executes processing on any of the storage units in accordance with the command from the batch execution control unit 41A and also notifies the batch execution control unit 41A of the result of processing on the relevant storage unit. When receiving a reference request from the terminal device 1, the data reference unit 42A, 42B refers to any of the storage units in accordance with the reference request and then sends the reference result to the terminal device 1.

The details of each component shown in FIG. 3 will be clarified below with reference to FIG. 4 to FIG. 11.

FIG. 4 is a configuration diagram showing an example of the database 52A. The database 52A is constituted from a row ID 521A, row data 522A, and an update status 523A, which are associated with each other. The row ID 521A stores an ID (IDentifire) that is information for identifying a row in the database 52A. The row data 522A stores row data designated by the row ID 521A. The update status 523A stores information indicating whether or the post-update data obtained as a result of the update by the batch processing is stored in the update buffer 53A. For example, if the post-update data is not stored in the update buffer 53A, the update status 523A stores "not updated"; and if the post-update data is stored in the update buffer 53A, the update status 523A stores "updated." Incidentally, the database 52B stored in the main memory apparatus 33B for the standby system 3B also has the same configuration as that of the database 52A.

The above-described database 52A shown in FIG. 4 is just an example, and a method for managing data in the database 52A is not limited only to this example. For example, the data in the database 52A may be managed, using a unit for identifying a table or a column, instead of the row ID.

Figure 5:
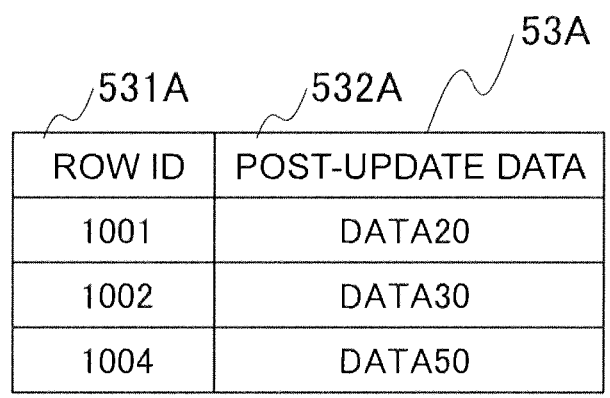
FIG. 5 is a configuration diagram of an update buffer according to an embodiment of the invention.

FIG. 5 is a configuration diagram showing an example of the update buffer 53A. The update buffer 53A is constituted from a row ID 531A and row data 532A, which are associated with each other. The row ID 531A stores an ID for identifying a row in the database updated by the batch processing. The row data 532A stores the content of the row data which is the post-update data when the row data indicated by the row ID 531A is updated by the batch processing. Incidentally, the update buffer 53B stored in the main memory apparatus 33B for the standby system 3B also has the same configuration as that of the update buffer 53A.

The above-described update buffer 53A shown in FIG. 5 is just an example, and a method for managing data in the database 53A updated by the batch processing is not limited only to this example. For example, the data of the updated database 53A may be managed, using a unit for identifying a table or a column, instead of the row ID.

Figure 6:
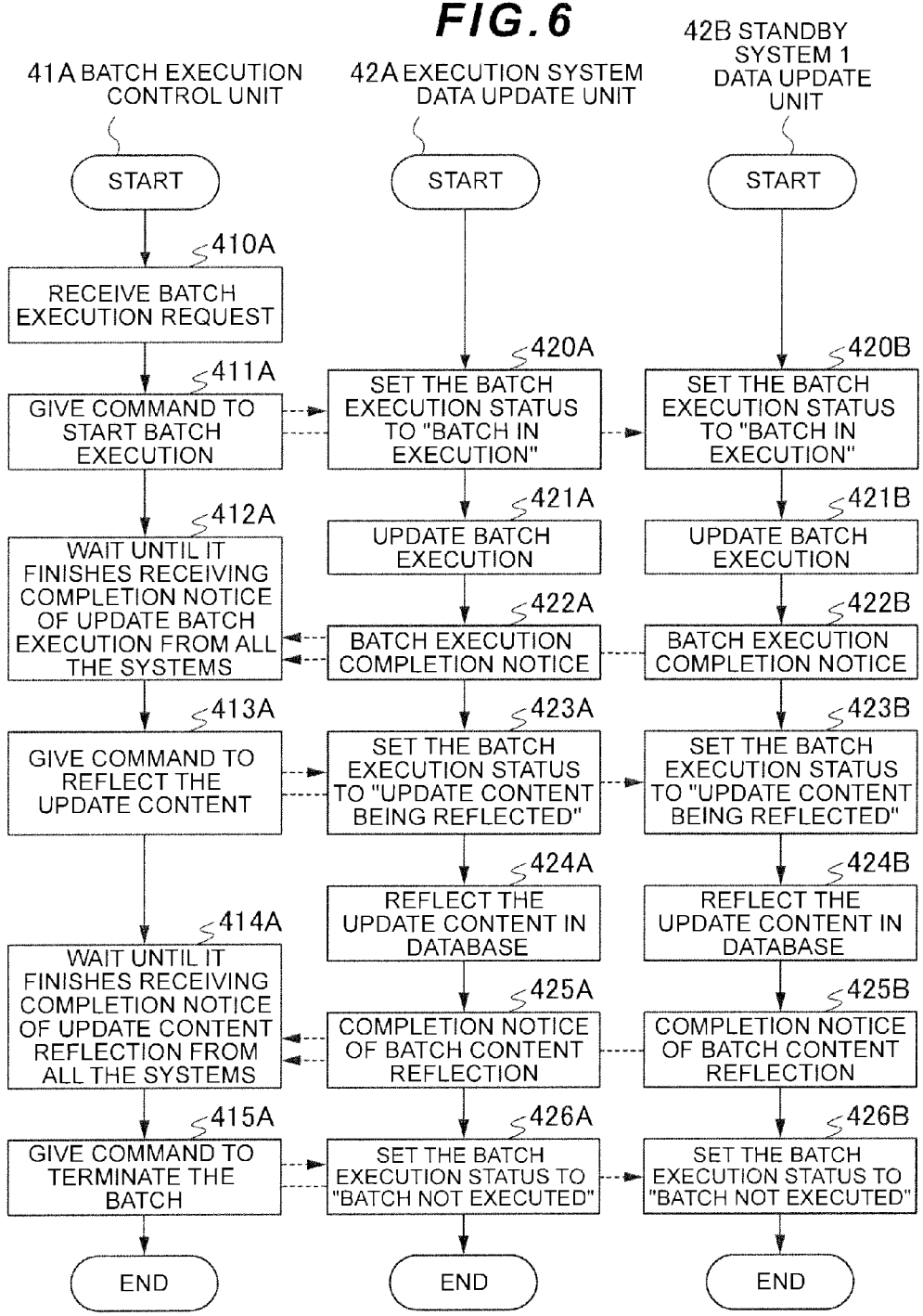
FIG. 6 is a flowchart illustrating batch execution control processing according to an embodiment of the invention.

FIG. 6 is a flowchart illustrating how the batch execution control unit 41A controls the batch execution in the entire data processing system.

In step 410A, the batch execution control unit 41A receives a batch execution request from the terminal device 1 while the entire data processing system operates online.

In step 411A, the batch execution control unit 41A gives a command to the data update unit 42A for the execution system 3A and the data update units 42B for all the standby systems 3B to start executing batch processing.

In step 420A, the data update unit 42A receives the command to start execution of the batch processing in step 411A and sets "batch in execution" as data indicating the batch processing execution status to the batch execution status unit (third storage unit) 43A.

In step 420B, while the entire data processing system operates online, the data update unit 42B receives the command to start execution of the batch processing in step 411A and sets "batch in execution" to the batch execution status unit (third storage unit) 43B.

In step 421A, the data update unit 42A updates the database 52A by the batch processing and stores the post-update database content in the update buffer 53A. For example, the data update unit 42A stores "DATA20" as the post-update data in the post-update data 532A corresponding to the row "1001" in the row ID 531A.

In step 421B, the data update unit 42B updates the database 52B by the batch processing and stores the post-update database content in the update buffer 53B.

In step 422A, the data update unit 42A notifies the batch execution control unit 41A of completion of the batch execution. Specifically speaking, on condition that the data before the update by the batch processing is stored in the database (first storage unit) 52A when the data update unit 42A receives the command from the batch execution control unit 41A to start the batch execution, the data update unit 42A stores the post-update data, which is obtained as a result of the update by the batch processing, in the update buffer (second storage unit) 53A and then notifies the batch execution control unit 41A of completion of the batch execution.

For example, on condition that pre-update data "DATA2" is stored in the row data 522A for the database 52A corresponding to the row "1001" in the row ID 521A, the data update unit 42A stores the post-update data "DATA20," which is obtained as a result of the update by the batch processing, in the post-update data 532A for the update buffer (second storage unit) 53A corresponding to the row "1001" in the row ID 531A.

In step 422B, the data update unit 42B notifies the batch execution control unit 41A of completion of the batch execution. Specifically speaking, on condition that the data before the update by the batch processing is stored in the database (first storage unit) 52B when the data update unit 42B receives the command from the batch execution control unit 41A to start the batch execution, the data update unit 42B stores the post-update data, which is obtained as a result of the update by the batch processing, in the update buffer (second storage unit) 53B and then notifies the batch execution control unit 41A of completion of the batch execution.

In step 412A, the batch execution control unit 41A waits until it receives the batch execution completion notice from the data update unit 42A for the execution system 3A and the batch execution completion notice from the data update units 42B for all the standby systems 3B.

In step 413A, on condition that the batch execution control unit 41A has received the batch execution completion notice from the data update unit 42A for the execution system 3A and the data update units 42B for all the standby systems 3B, the batch execution control unit 41A gives a command to the data update unit 42A for the execution system 3A and the data update units 42B for all the standby systems 3B to reflect the update content (post-update data) by the batch processing in the database 52A, 52B.

In step 423A, the data update unit 42A receives the command to reflect the update content by the batch processing in the database 52A in step 413A and sets "update content being reflected" as data indicating the batch processing execution status to the batch execution status unit 43A.

In step 423B, the data update unit 42B receives the command to reflect the update content by the batch processing in the database 52B in step 413A and sets "update content being reflected" to the batch execution status unit 43B.

In step 424A, the data update unit 42A reflects the post-update database content (post-update data as a result of the update by batch processing), which is stored in the update buffer 53A, in the database 52A. For example, the data update unit 42A stores "DATA20" in the row data 522A for the database 52A corresponding to the row "1001" in the row ID 521A.

In step 424B, the data update unit 42B reflects the post-update database content (post-update data as a result of the update by batch processing), which is stored in the update buffer 53B, in the database 52B.

In step 425A, the data update unit 42A notifies the batch execution control unit 41A of completion of reflection of the update content in the database 52A.

In step 425B, the data update unit 42B notifies the batch execution control unit 41A of completion of reflection of the update content in the database 52B.

In step 414A, the data execution control unit 41A waits until it receives update content reflection completion notice from the data update unit 42A for the execution system 3A and the update content reflection completion notice from the data update units 42B for all the standby systems 3B.

In step 415A, on condition that the data execution control unit 41A has received the update content reflection completion notice from the data update unit 42A for the execution system 3A and the update content reflection completion notice from the data update units 42B for all the standby systems 3B, the data execution control unit 41A notifies the data update unit 42A for the execution system 3A and the data update units 42B for all the standby systems 3B of termination of the batch processing.

In step 426A, the data update unit 42A receives the batch processing termination notice in step 415A and sets "batch not executed" as data indicating the batch processing execution status to the batch execution status unit 43A.

In step 426B, the data update unit 42B receives the batch processing termination notice in step 415A and sets "batch not executed" to the batch execution status unit 43B.

As a result of the above-described processing, the execution system 3A can realize the batch execution on each system (2000A), wait until completion of the update batch execution on all the systems (2100A), reflect the update content in each system (2200A), and set the "batch in execution" (300) or "update content being reflected" (400) to the batch execution status of the entire data processing system as shown in FIG. 1.

Figure 7:
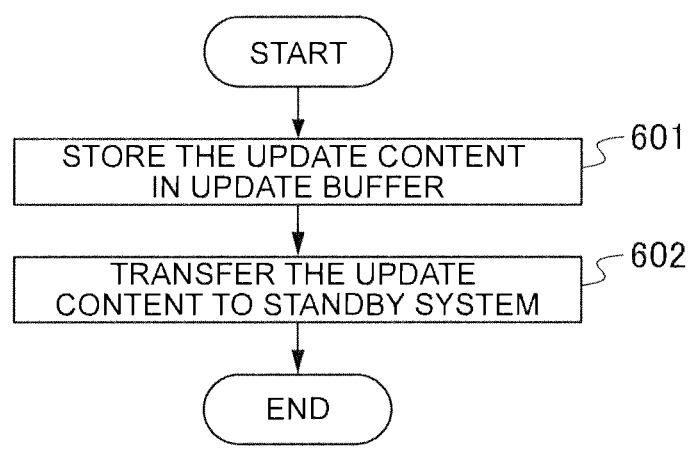
FIG. 7 is a flowchart illustrating update batch execution processing in an execution system in a case where batch processing according to an embodiment of the invention is executed by the execution system and the data update content is transferred to each system.

FIG. 7 is a flowchart illustrating the details of processing by the update batch execution 421A as shown in FIG. 6.

In step 601, the data update unit 42A executes the batch processing on the database 52A, creates the post-update database content from the content of the batch processing and the content of the database 52A, and stores the post-update database content (post-update data as a result of the update by batch processing) in the update buffer 53A.

In step 602, the data update unit 42A transfers the post-update database content (post-update data as a result of the update by batch processing), which was created in step 601, to the data update unit 42B for the standby system 3B.

As a result of the above-described processing, the execution system 3A can realize the update batch execution (3000A) and store the post-update database content in the update buffer 53A as shown in FIG. 1.

Figure 8:
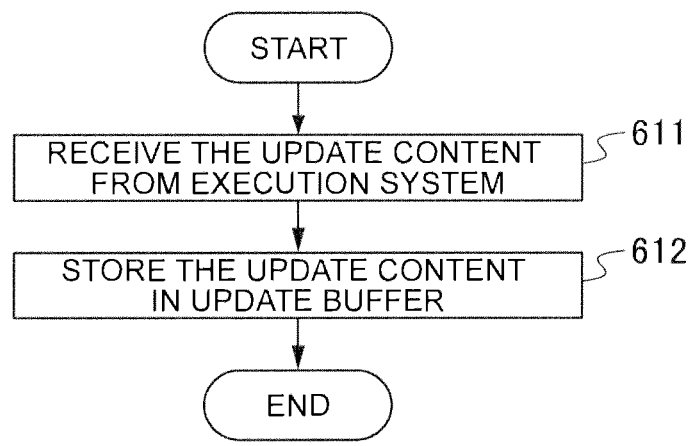
FIG. 8 is a flowchart illustrating update batch execution processing in a standby system in a case where batch processing according to an embodiment of the invention is executed by the execution system and the data update content is transferred to each system.

FIG. 8 is a flowchart illustrating the details of processing by the update batch execution 421B as shown in FIG. 6.

In step 611, the data update unit 42B receives the post-update database content (post-update data as a result of the update by batch processing) in step 602 in FIG. 7.

In step 612, after receiving the post-update database content (post-update data as a result of the update by batch processing) in step 611, the data update unit 42B stores the received content as the update content in the update buffer 53B.

As a result of the above-described processing, the standby system 3B can realize the update batch execution (3000B) and store the post-update database content in the update buffer 53A as shown in FIG. 1.

Figure 9:
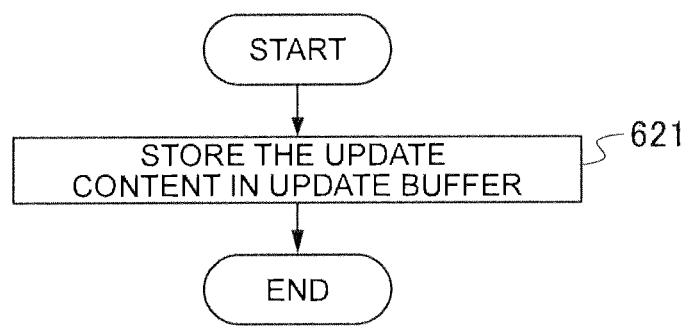
FIG. 9 is a flowchart illustrating update batch execution processing in a case where batch processing according to an embodiment of the invention is executed by each system.

FIG. 9 is a flowchart illustrating the details of another example of the update batch execution 421A by the execution system 3A and the update batch execution by the standby system 3B as shown in FIG. 6.

In step 621, the data update unit 42A for the execution system 3A or the data update unit 42B for the standby system 3B executes the batch processing on the database 52A or the database 52B, creates the post-update database content from the content of the batch processing and the content of the database 52A or the database 52B, and stores the post-update database content in the update buffer 53A or the update buffer 53B.

Figure 10:
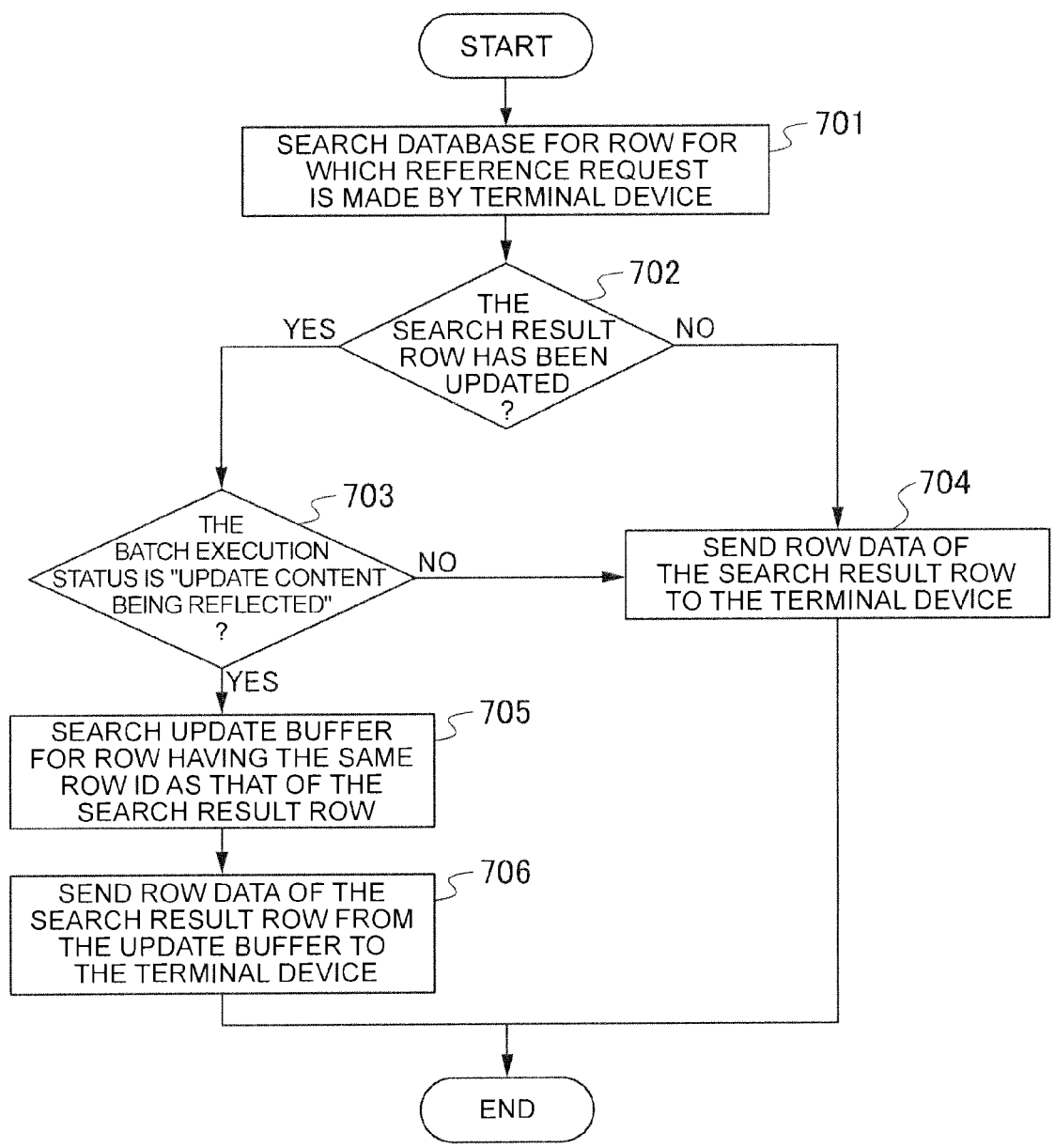
FIG. 10 is a flowchart illustrating data reference processing according to an embodiment of the invention.

FIG. 10 is a flowchart illustrating data reference processing by the data reference unit 51A. Incidentally, the data reference unit 51B executes the same processing as explained below.

In step 701, while the entire data processing system operates online, the data reference unit 51A receives a reference request from the terminal device 1 and searches the database 52A for a reference object row, to which reference should be made, according to the received reference request.

In step 702, the data reference unit 51A refers to the update status 523A in the reference object row found by the search in step 701 and judges whether the reference result has been updated or not. If the judgment result is YES, the data reference unit 51A proceeds to step 703; and if the judgment result is NO, the data reference unit 51A proceeds to step 704.

In step 703, the data reference unit 51A refers to the batch execution status unit 43A and judges whether the batch execution status is "update content being reflected" or not. If the judgment result is YES, the data reference unit 51A proceeds to step 705; and if the judgment result is NO, the data reference unit 51A proceeds to step 704.

In step 704, the data reference unit 51A returns the row data 522A, which was the reference object row and found by the search in step 701, to the terminal device 1. For example, If the row ID 521A of the reference object row found by the search in step 701 is the row "1001," the data reference unit 51A returns "DATA2" to the terminal device 1.

In step 705, the data reference unit 51A searches the update buffer 53A for a row having the same row ID 531A as the row ID 521 of the reference object row found by the search in step 701. For example, if the row ID 521A of the reference object row found by the search in step 701 is the row "1001," the data reference unit 51A searches the update buffer 53A for the post-update data 532A corresponding to the row "1001" in the row ID 531A.

In step 706, the data reference unit 51A returns the post-update data 532A of the row found by the search of the update buffer 53A in step 705, to the terminal device 1. For example, if the post-update data 532A corresponding to the row "1001" in the row ID 531A is found by the search of the update buffer 53A, the data reference unit 51A returns "DATA20" to the terminal device 1.

As described above, after receiving the reference request from the terminal device 1, the data reference unit 51A refers to the reference object row in the database (first storage unit) 52A and judges whether the reference object row has been updated or not. If it is determined that the reference object row has not been updated, the data reference unit 51A sends the content of the database (first storage unit) 52A as the reference result to the terminal device 1. If it is determined that the reference object row has been updated, the data reference unit 51A refers to the batch execution status unit (third storage unit) 43A and judges whether the batch processing execution status is "update content being reflected" or not. If the batch processing execution status is "batch in execution," but not "update content being reflected," the data reference unit 51A sends the content of the database (first storage unit) 52A as the reference result to the terminal device 1 and completes the batch execution; and if the batch processing execution status is "update content being reflected," the data reference unit 51A sends the content of the update buffer (second storage unit) 53A as the reference result to the terminal device 1.

As a result of the above-described processing, the execution system 3A can realize the reference result (7000A, 9000A) in response to the reference request (6000A, 8000A) and the standby system 3B can realize the reference result (7000B, 9000B) in response to the reference request (6000B, 8000B) as described in FIG. 1.

Incidentally, if the data update unit 42A, 42B notifies the batch execution control unit 41A of completion of reflection of the update content in step 424A, 424B in FIG. 6 on condition that each data update unit 42A, 42B reflects the update content in its database 52A, 52B and then sets the completion of the update content reflection to the batch execution status unit 43A, 43B, the data update unit 42A can judge in step 703 whether the batch processing execution status is "update content reflection completed" or not, instead of judging whether the batch processing execution status is "update content being reflected" or not.

In this case, if it is determined that the update content reflection is completed, that means the content of the update buffer 53A has been reflected in the database 52A. So, even if reference is made to the row, for which the user made the reference request, in the update buffer 53A or the database 52A in steps 705, 706, the same post-update data can be sent as the reference result to the terminal device 1.

Figure 11:
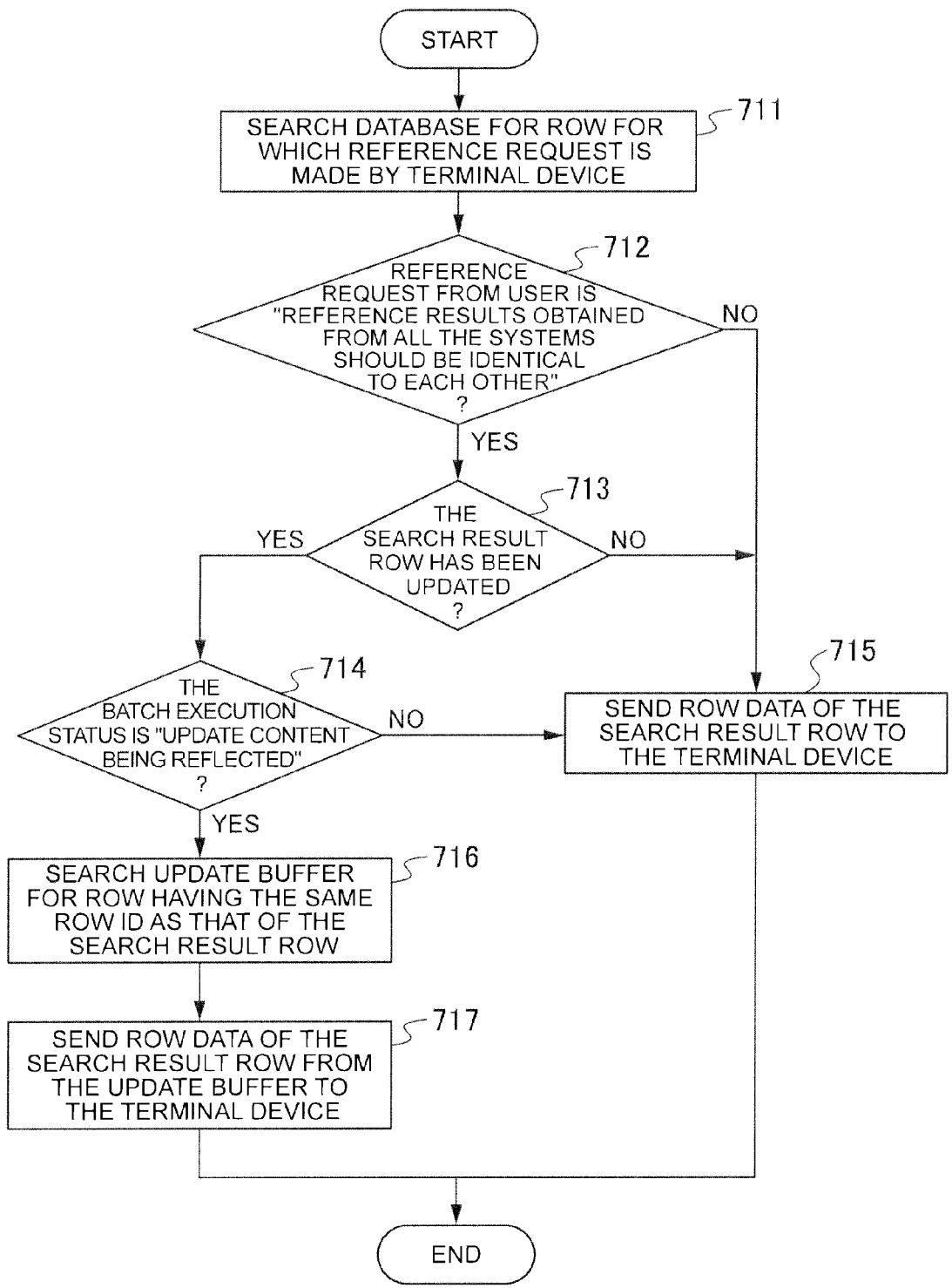
FIG. 11 is a flowchart illustrating data reference processing in a case a data reference request command is given according to an embodiment of the invention.

FIG. 11 is a flowchart illustrating another example of data reference processing by the data reference unit 51A. Incidentally, the data reference unit 51B executes the same processing as explained below.

In step 711, while the entire data processing system operates online, the data reference unit 51A receives a reference request from the terminal device 1 and searches the database 52A for the reference object row in accordance with the received reference request. In this case, the reference request is composed of designation as to which row in the database 52A reference should be make, and designation as to whether or not the reference results, which are obtained from the execution system 3A and all the standby systems 3B and are to be returned, should be made identical to each other.

In step 712, the data reference unit 51A refers to the reference request in step 711 and judges whether or not the request designates that the reference results, which are obtained from the execution system 3A and all the standby systems 3B and are to be returned, should be made identical to each other. If the judgment result is YES, the data reference unit 51A proceeds to step 713; and if the judgment result is NO, the data reference unit 51A proceeds to step 715.

In step 713, the data reference unit 51A refers to the update status 523A in the reference object row found by the search in step 711 and judges whether the reference result has been updated or not. If the judgment result is YES, the data reference unit 51A proceeds to step 714; and if the judgment result is NO, the data reference unit 51A proceeds to step 715.

In step 714, the data reference unit 51A refers to the batch execution status unit 43A and judges whether the batch execution status is "update content being reflected" or not. If the judgment result is YES, the data reference unit 51A proceeds to step 716; and if the judgment result is NO, the data reference unit 51A proceeds to step 715.

In step 715, the data reference unit 51A returns the row data 522A, which was the reference object row and found by the search in step 711, to the terminal device 1.

In step 716, the data reference unit 51A searches the update buffer 53A for a row having the same row ID 531A as the row ID 521 of the reference object row found by the search in step 711.

In step 717, the data reference unit 51A returns the post-update data 532A of the row found by the search of the update buffer 53A in step 716, to the terminal device 1.

As described above, after receiving the reference request from the terminal device 1, the data reference unit 51A refers to the reference object row in the database (first storage unit) 52A and judges whether or not the "reference results obtained from all the systems should be made identical to each other." If the judgment result is NO, the data reference unit 51A sends the content of the database (first storage unit) 52A as data indicating the state of being in the process of executing the batch processing, to the terminal device 1.

If the judgment result is YES, the data reference unit 51A refers to the reference object row in the database (first storage unit) 52A and judges whether the reference object row has been updated or not. If it is determined that the reference object row has not been updated, the data reference unit 51A sends the content of the database (first storage unit) 52A as the reference result to the terminal device 1. If it is determined that the reference object row has been updated, the data reference unit 51A refers to the batch execution status unit (third storage unit) 43A and judges whether the batch processing execution status is "update content being reflected" or not. If the batch processing execution status is not "update content being reflected," the data reference unit 51A sends the content of the database (first storage unit) 52A as the reference result to the terminal device 1 and completes the batch execution; and if the batch processing execution status is "update content being reflected," the data reference unit 51A sends the content of the update buffer (second storage unit) 53A as the reference result to the terminal device 1.

Incidentally, if the data update unit 42A, 42B notifies the batch execution control unit 41A of completion of reflection of the update content in step 424A, 424B in FIG. 6 on condition that each data update unit 42A, 42B reflects the update content in its database 52A, 52B and then sets the completion of the update content reflection to each batch execution status unit 43A, 43B, the data update unit 42A can judge in step 714 whether the batch processing execution status is "update content reflection completed" or not, instead of judging whether the batch processing execution status is "update content being reflected" or not.

In this case, if it is determined that the update content reflection is completed, that means the content of the update buffer 53A has been reflected in the database 52A. So, even if reference is made to the row, for which the user made the reference request, in the update buffer 53A or the database 52A in steps 716, 717, the same post-update data can be sent as the reference result to the terminal device 1.

Since the batch execution control unit 41A for the execution system 3A controls batch execution in the execution system 3A and the two or more standby systems 3B according to this embodiment as described above, the batch execution status becomes unique in the data processing system as a whole.

This embodiment is designed so that when the terminal device 1 sends a reference request to the execution system 3A or two or more standby systems 3B, the batch execution status is judged and the reference results is then returned to the terminal device 1 according to the judgment result. Therefore, the reference results obtained from all the systems in response to the same reference made at the same time can be made identical to each other.

Furthermore, the databases 52A, 52B having the same configuration are placed in the main memory apparatus 33A, 33B for each system and the update status of the database 52A, 52B is designated as a reference object according to this embodiment. Therefore, it is possible to promptly return the reference result of each system to the terminal device 1.

What is claimed is:

1. A data processing method for a plurality of units, each unit including a storage device having at least a first storage unit and a second storage unit as a plurality of storage units configured to store data, and a data processing apparatus configured to process the data in the storage units, wherein the data processing apparatus belonging to at least one unit from among the plurality of units is configured to execute a first batch execution step of executing batch processing requiring an update on the data in the first storage device when receiving a batch execution request from a terminal device, which is configured to make the request for the processing; and wherein the data processing apparatus belonging to each unit executes:

a first storage step of storing post-update data, which are obtained as a result of the update in the first batch execution step, in the second storage unit for each storage device;

a first reflection step of, subject to completion of the processing for storing the post-update data in the second storage unit for each storage device, starting reflecting the post-update data, which have been stored in the second storage unit for each storage device, in the first storage unit for each storage device, thereby executing reflection;

a first judgment step of judging an execution status of the batch processing based on statuses of the post-update data stored and reflected in the first storage unit and the second storage unit in the first batch execution step when receiving a reference request from the terminal device after the batch execution request; and a first transmission step of sending a corresponding content of the first storage unit for each storage device or a corresponding content of the second storage unit for each storage device as a reference result to the terminal device in accordance with a judgment result of the first judgment step;

wherein in the first judgment step, the data processing apparatus is configured to judge whether processing for storing the post-update data in the second storage unit for each storage device has been completed or not;

wherein when an affirmative judgment result is returned in the first judgment step, the data processing apparatus is configured to send the post-update data as the corresponding content of the second storage unit for each storage device to the terminal device in the first transmission step; and wherein when a negative judgment result is returned in the first judgment step, the data processing apparatus is configured to send data before the update by the batch processing as the corresponding content of the first storage unit for each storage device to the terminal device in the first judgment step.

2. The data processing method according to claim 1, wherein in the first batch execution step, the data processing apparatus which has executed the batch processing from among the plurality of the data processing apparatuses, is configured to transfer the post-update data, which are obtained as a result of the update by the hatch processing, to the data processing apparatus which has not executed the batch processing; and wherein in the first storage step, when receiving the post-update data transferred from the data processing apparatus which has executed the batch processing, the data processing apparatus which has not executed the batch processing is configured to store the received post-update data in the second storage unit for the storage device belonging to the same unit as the data processing apparatus which has not executed the hatch processing.

3. The data processing method according to claim 1, wherein the data processing apparatus individually is configured to execute the hatch processing in the first hatch execution step; and the data processing apparatus is configured to store the post-update data, which are obtained as a result of the update by the batch processing individually executed, in the second storage unit for each storage device in the first storage step.

4. The data processing method according to claim 1, wherein the data processing apparatus is configured to execute a second storage step of storing the result of processing in the first storage step and the first reflection step as data indicating an execution status of the batch processing, in a third storage unit for each storage device; and wherein in the first judgment step, the data processing apparatus is configured to refer to the third storage unit for each storage device and to judge the execution status of the batch processing.

5. The data processing method according to claim 1, where in the first judgment step, the data processing apparatus is configured to judge whether processing for reflecting the post-update data in the first storage unit for each storage device has been completed or not, as processing after storing the post-update data, which are obtained as a result of the update by the batch processing, in the second storage unit for each storage device;

wherein when an affirmative judgment is returned in the first judgment step that the processing for reflecting the post-update data has been completed, the data processing apparatus is configured to send the post-update data as the corresponding content of the first storage unit or the second storage unit for each storage device to the terminal device in the first transmission step; and wherein when a negative judgment is returned in the first judgment step that the processing for reflecting the post-update data in the first storage unit for each storage device has not been completed, the data processing apparatus is configured to send the post-update data as the corresponding content of the second storage unit for each storage device to the terminal device.

6. The data processing method according to claim 1, wherein on condition that the post-update data are stored in the second storage unit for each storage device, the data processing apparatus is configured to store data indicating that the relevant data have been updated, as a status of the update required by the batch processing, in the first storage unit for each storage device in the first storage step;

wherein prior to judgment of an execution status of the batch processing in the first judgment step, the data processing apparatus is configured to judge whether or not the data indicating that the relevant data have been updated, as the status of the update required by the batch processing, are stored in the first storage unit for each storage device; and when an affirmative judgment result is returned that the data indicating that the relevant data have been updated, as the status of the update required by the batch processing, are stored in the first storage unit for each storage device, the data processing apparatus is configured to judge whether processing for storing the post-update data in the second storage unit for each storage device has been completed or not; and wherein when an affirmative judgment is returned in the first judgment step that the data indicating that the relevant data have been updated, as the status of the update required by the batch processing, are stored in the first storage unit for each storage device, and the processing for storing the post-update data in the second storage unit for each storage device has been completed, the data processing apparatus is configured to send the post-update data as the corresponding content of the second storage unit for each storage device to the terminal device in the first transmission step; and wherein when a negative judgment is returned in the first judgment step that the data indicating that the relevant data have been updated, as the status of the update required by the batch processing, are not stored in the first storage unit for each storage device, or that the data indicating that the relevant data have been updated, as the status of the update required by the batch processing, are stored in the first storage unit for each storage device, but the processing for storing the post-update data in the second storage unit for each storage device has not been completed, the data processing apparatus is configured to send data before the update by the batch processing as the corresponding content of the first storage unit for each storage device, to the terminal device.

7. The data processing method according to claim 1, wherein on condition that the post-update are stored in the second storage unit for each storage device, the data processing apparatus is configured to store data indicating that the relevant data have been updated, as a status of the required by the batch processing, in the first storage unit for each storage device in the first storage step;

wherein prior to judgment of an execution status of the batch processing in the first judgment step, the data processing apparatus is configured to judge whether or not the batch execution request requires that the reference results obtained from all the data processing apparatuses be made identical to each other; and when an affirmative result is obtained for the above judgment that the batch execution request requires that the reference results obtained from all the data processing apparatuses be made identical to each other, the data processing apparatus is configured to judge whether or not the data indicating that the relevant data have been updated, as the status of the update required by the batch processing, are stored in the first storage unit for each storage device; and when an affirmative result is obtained for the above judgment that the data indicating that the relevant data have been updated, as the status of the update required by the batch processing, are stored in the first storage unit for each storage device, the data processing apparatus is configured to judge whether processing for storing the post-update data in the second storage unit for each storage device has been completed or not; and wherein when an affirmative judgment is returned in the first judgment step that the batch execution request requires that the reference results obtained from all the data processing apparatuses be made identical to each other, and the data indicating that the relevant data have been updated, as the status of the update required by the batch processing, are stored in the first storage unit for each storage device, and the processing for storing the post-update data in the second storage unit for each storage device has been completed, the data processing apparatus is configured to send the post-update data as the corresponding content of the second storage unit for each storage device to the terminal device in the first transmission step; and wherein when a negative judgment is returned in the first judgment step that the batch execution request does not require that the reference results obtained from all the data processing apparatuses be made identical to each other, or that the data indicating that the relevant data have been updated, as the status of the update required by the batch processing, are not stored in the first storage unit for each storage device, or that the data indicating that the relevant data have been updated, as the status of the update required by the batch processing, are stored in the first storage unit for each storage device, but the processing for storing the post-update data in the second storage unit for each storage device has not been completed, the data processing apparatus is configured to send data before the update by the batch processing as the corresponding content of the first storage unit for each storage device, to the terminal device.

8. A non-transitory computer readable medium storing therein a program, which, when executed, causes a data processing apparatus of one of a plurality of storage devices to execute a data process method, wherein the data processing apparatus comprises a computer and at least one of the storage devices has a first storage unit and a second storage unit, the method comprising:

as a step executed by the data processing apparatus of a plurality of apparatuses of the respective plurality of storage devices, a first batch execution step of executing batch processing requiring an update on data in the first storage device when receiving a batch execution request from a terminal device configured to make the request for the processing; and as steps executed by the data processing apparatus, a first storage step of storing post-update data, which are obtained as a result of the update in the first batch execution step, in the second storage unit for each storage device;

a first reflection step of, subject to completion of the processing for storing the post-update data in the second storage unit for each storage device, starting reflecting the post-update data, which have been stored in the second storage unit for each storage device, in the first storage unit for each storage device, thereby executing reflection;

a first judgment step of judging an execution status of the batch processing based on statuses of the post-update data stored and reflected in the first storage unit and the second storage unit in the first batch execution step when receiving a reference request from the terminal device after the batch execution request; and a first transmission step of sending a corresponding content of the first storage unit for each storage device or a corresponding content of the second storage unit for each storage device as a reference result to the terminal device in accordance with a judgment result of the first judgment step;

wherein in the first judgment step, the data processing apparatus is configured to judge whether processing for storing the post-update data in the second storage unit for each storage device has been completed or not;

wherein when an affirmative judgment result is returned in the first judgment step, the data processing apparatus is configured to send the post-update data as the corresponding content of the second storage unit for each storage device to the terminal device in the first transmission step; and wherein when a negative judgment result is returned in the first judgment step, the data processing apparatus is configured to send data before the update by the batch processing as the corresponding content of the first storage unit for each storage device to the terminal device in the first judgment step.

9. A data processing system comprising at least one computer comprising a plurality of units, each unit including a storage device having at least a first storage unit and a second storage unit as a plurality of storage units configured to store data, and a data processing apparatus configured to process the data in the storage units, wherein the data processing apparatus belonging to at least one unit from among the plurality of units includes a batch execution control unit configured to generate and output a command relating to batch processing when receiving a batch execution request from a terminal device configured to make the request for the processing;

wherein the data processing apparatus belonging to each unit includes:

a data update unit configured to execute processing on each storage device in accordance with a command from the batch execution control unit and to notify the batch execution control unit of a result of the processing on each storage unit; and a data reference unit, when receiving a reference request from the terminal device, configured to refer to each storage device in accordance with the reference request and to send the reference result to the terminal device;

wherein when receiving the batch execution request from the terminal device, the batch execution control unit is configured to give a batch execution start command to each data update unit; and subject to reception of batch execution completion notice from all the data update units, the batch execution control unit is configured to give an update content reflection command to each data update unit; and subject to reception of update content reflection completion notice from all the data update units, the batch execution control unit is configured to give a batch termination command to each data update unit;

wherein at least one data update unit, from among the data update units which have received the batch execution start command from the batch execution control unit, is configured to execute batch processing on the data in the storage devices;

wherein when receiving the batch execution start command from the batch execution control unit, the data update unit is configured to store post-update data, which are obtained as a result of the update by the batch processing, in the second storage unit for each storage device and to notify the batch execution control unit of completion of the batch execution;

when receiving the update content reflection command from the batch execution control unit, the data update unit is configured to reflect the post-update data, which are stored in the second storage unit for each storage device, in the first storage unit for each storage device and to notify the batch execution control unit of completion of the update content reflection; and the data update unit is configured to store data indicating an execution status of the batch processing in a third storage unit for each storage device in association with processing on the first storage unit or the second storage unit for each storage device; and wherein when receiving the reference request from the terminal device, the data reference unit is configured to refer to the third storage unit for each storage device, to judge the execution status of the batch processing based on statuses of the post-update data stored and reflected in the first storage unit and the second storage unit, and to send a corresponding content of the first storage unit for each storage device or a corresponding content of the second storage unit for each storage device as a reference result to the terminal device;

wherein the data reference unit is configured to refer to the third storage unit for each storage device and to judge whether or not data indicating that the post-update data are in a state before being reflected in the first storage unit for each storage device and the post-update data are stored in the second storage unit for each storage device, exist in the third storage unit;

when an affirmative result is obtained for the above judgment, the data reference unit is configured to send the post-update data as the corresponding content of the second storage unit for each storage device to the terminal device;

when a negative result is obtained for the above judgment, the data reference unit is configured to send data before the update by the batch processing as the corresponding content of the first storage unit for each storage device to the terminal device.

10. The data processing system according to claim 9, wherein the data update unit which has executed the batch processing, from among the plurality of the data update units, is configured to transfer the post-update data, which are obtained as a result of the update by the batch processing, to the data update unit which has not executed the batch processing; and wherein when receiving the post-update data transferred from the data update unit which has executed the batch processing, the data update unit which has not executed the batch processing is configured to store the received post-update data in the second storage unit storage device.

11. The data processing system according to claim 9, wherein the data update unit is configured to execute the batch processing individually; and the data update unit is configured to store the post-update data, which are obtained as a result of the update by the batch processing individually executed, in the second storage unit for each storage device.

12. The data processing system according to claim 9, wherein the data reference unit is configured to refer to the third storage unit for each storage device and to judge whether or not data indicating that the post-update data are in a state after being stored in the second storage unit for each storage device and the post-update data are reflected in the first storage unit for each storage device, exist in the third storage unit;

when an affirmative result is obtained for the above judgment, the data reference unit is configured to send the post-update data as the corresponding content of the first storage unit or the second storage unit for each storage device to the terminal device;

when a negative result is obtained for the above judgment, the data reference unit is configured to send the post-update data as the corresponding content of the second storage unit for each storage device to the terminal device.

13. The data processing system according to claim 9, wherein the first storage unit for each storage device comprises a database.

14. The data processing system according to claim 9, wherein the first storage unit for each storage device comprises a memory database.

* * * * *